United States Patent [19]

Daetz et al.

[11] Patent Number: 5,625,289

[45] Date of Patent: Apr. 29, 1997

[54] MAGNETIC DEVICE FOR DETECTING ANGLE OF ROTATION

[75] Inventors: Michael Daetz, Tiddische; Roger Pohlmann, Braunschweig, both of Germany

[73] Assignee: Deutsche Automobilgesellschaft mbH, Braunschweig, Germany

[21] Appl. No.: 313,854

[22] Filed: Sep. 26, 1994

[30] Foreign Application Priority Data

Oct. 4, 1993 [DE] Germany .............. 43 33 800.3

[51] Int. Cl.⁶ .............. G01B 7/30; B60K 20/00; G05G 1/00; H03M 1/22
[52] U.S. Cl. .............. 324/207.14; 74/335; 74/473 R; 123/617; 324/207.2; 324/207.21; 324/207.22; 324/207.25; 341/15
[58] Field of Search .............. 324/207.14, 207.2, 324/207.21, 207.22, 207.25, 173, 174; 341/15; 74/335, 473 R; 123/617

[56] References Cited

U.S. PATENT DOCUMENTS

| | | |
|---|---|---|
| 3,366,909 | 1/1968 | Hini et al. . |
| 3,742,243 | 6/1973 | Gamble . |
| 4,406,272 | 9/1983 | Kiess et al. .............. 324/207.2 X |
| 5,025,213 | 6/1991 | Dobler et al. .............. 324/207.25 X |

FOREIGN PATENT DOCUMENTS

| | | |
|---|---|---|
| 0340418 | 11/1989 | European Pat. Off. . |
| 1779492 | 10/1958 | Germany . |
| 1490681 | 11/1972 | Germany . |
| 31383827 | 4/1983 | Germany . |
| 3512697 | 10/1986 | Germany . |
| 2815360 | 3/1987 | Germany . |
| 3633793 | 4/1987 | Germany . |
| 3732958 | 7/1990 | Germany . |
| 4014885 | 11/1990 | Germany . |
| 4018187 | 12/1991 | Germany . |
| 4125715 | 2/1992 | Germany . |
| 9116131 | 4/1992 | Germany . |
| 4108388 | 9/1992 | Germany . |
| 4121410 | 1/1993 | Germany . |
| 4129576 | 3/1993 | Germany . |
| 58-166204 | 1/1983 | Japan . |
| 63-192930 | 8/1988 | Japan . |
| 2093295 | 8/1982 | United Kingdom . |
| 2100343 | 12/1982 | United Kingdom . |

OTHER PUBLICATIONS

Ulrich Eberhardt et al: "Anwendung von Feldplatten beim elektrischen Messen nichtelektrischer Grössen." In: Siemens–Bauteile–Informationen, 6, 1968, vol. 5, pp. 172–177.

Der Zuliefermarkt, Jul. 1990, p. ZM 165.

Patent Abstracts of Japan, 61–120904, 35 p. 508, Oct. 21 1986, vol. 10, No. 308.

Patent Abstracts of Japan, 3–276014, 123 p. 1322, Mar. 10, 1992, vol. 16, No. 96.

*Primary Examiner*—Gerard R. Strecker
*Attorney, Agent, or Firm*—Spencer & Frank

[57] ABSTRACT

For detecting the angle of rotation of a shaft, in particular of a gear shift shaft in a gear change box for a motor vehicle, a device is proposed in which a carrier arrangement carries a magnet and in its proximity magnetically sensitive sensors. A screening device, rigidly attached to the shaft, moves in the intermediate space between the magnet and the sensors. This screening device is made from a ferromagnetic material such that the magnetic field permeating the sensors is influenced in a manner whereby the sensors generate a signal that unambiguously identifies the position of the shaft.

20 Claims, 1 Drawing Sheet

MAGNETIC DEVICE FOR DETECTING ANGLE OF ROTATION

BACKGROUND OF THE INVENTION

The invention relates to a device for detecting the angle of rotation of a shaft, in particular of a gear shift shaft in a gear change box for a motor vehicle, where the position of the shaft is scanned without contacting or touching by means of magnetic-field-sensitive sensors in the casing and where the magnetic field strength varies at the point where the sensors are located according to the position of the shaft. A device for identifying the gear shift state is known from the German Patent publication G 91 16 131 U1 (made known on Apr. 9, 1992) according to which the gear shift shaft is rigidly attached via a carrying element to a permanent magnet open on one side. In the region of motion of this permanent magnet, there is an arrangement of reed switches, with one reed switch being provided for each position of the permanent magnet corresponding to each gear change position. In this known device, in each position of the magnet between it and the reed switch concerned there is a shutter of magnetic screening material with openings in the vicinity of the reed switches so that the allocated reed switch is permeated by a magnetic field of sufficient strength while the other reed switches are screened. This device can be placed directly in the gearbox casing in spite of the ambient conditions there, marked by extreme temperature changes, vibration and inaccessibility.

A disadvantage of this known arrangement is that the number of reed switches corresponds to the number of gear shift states to be detected. Therefore, with a large number of gear shift states to be detected, the arrangement holding the sensors becomes very large and consequently the space required for this arrangement also increases. Finally, the concept involving the known device is highly inflexible when it comes to increasing the number of shift states to be identified because an increase in the number of reed switches is first needed and the arrangement holding the sensors must be modified accordingly.

SUMMARY OF THE INVENTION

The object of the invention is to provide a device for detecting the angle of rotation of a shaft of the kind described at the outset requiring a minimum number of sensors for the number of shaft positions to be identified.

According to the invention there is a carrier arrangement for holding a magnet and also the sensors. A screening device, rigidly attached to the shaft, moves between the magnet and the sensors and is so designed that the magnetic field flowing through the sensor concerned is influenced in a predetermined manner in such a way that the sensors jointly generate a signal that unambiguously identifies the position of the shaft.

The arrangement in accordance with the invention permits that the magnetic field flowing through the sensors can be influenced for each individual sensor in each position of the shaft to be detected by means of the screening device. The design of the screening device can therefore make it possible to define in each shaft position to be detected whether no sensor, only one sensor, several sensors, or all sensors are to respond. Such a configuration of the screening device thus corresponds to a coding of each position of the shaft to be detected. For instance, if two or four sensors are installed, four or sixteen switched states respectively can be detected whereas in the known device described above only two or four switched states respectively can be detected.

In an advantageous further development of the invention, the screening device is given the form of a flat body, for example a disk shape, that moves between the magnet and the sensors.

To allow the screening device to have the desired effect on the magnetic field flowing through the sensor concerned, it is made of a ferromagnetic material and has openings so that the relevant magnetic field is either screened off or can flow through the sensor without loss of strength.

In another advantageous embodiment, however, the screening device is made of a non-magnetic material and at certain places there is ferromagnetic material that influences the magnetic field flowing through the sensor concerned in order to either screen off the sensor or to allow the full strength of the magnetic field to permeate it.

Furthermore, the carrier arrangement for holding the magnet can at the same time also hold the sensors. This carrier arrangement can be U-shaped with one leg holding the magnet and the other the sensors. The screening device then moves in the gap between the two legs.

The carrier can also be E-shaped, where the middle leg holds the magnet and the two outer legs the sensors. In this embodiment of the carrier arrangement, the screening device is U-shaped so that each of its legs moves between the magnet and the sensors. The two legs of the screening device can in this case be disk-shaped and have a coding of the above-mentioned kind. The same number of sensors can advantageously be placed on the outer legs of the screening device, for instance two sensors that allow sixteen positions of the shaft to be detected.

Hall sensors, reed switches or magnetoresistive sensors can advantageously be used as sensors.

The device in accordance with the invention can be used to advantage in order to detect the gear shift state of a gear change box, in particular also of an automatic gear change box for motor vehicles.

There are moreover other possibilities of utilizing the invention in a motor vehicle, for instance for identifying the position of the camshaft in an internal combustion engine or for identifying the position of the throttle valve potentiometer in the intake pipe.

BRIEF DESCRIPTION OF THE DRAWINGS

The invention will now be described and explained on the basis of an embodiment example in conjunction with the drawings. The figures show.

DESCRIPTION OF THE PREFERRED EMBODIMENTS

Figure 1:
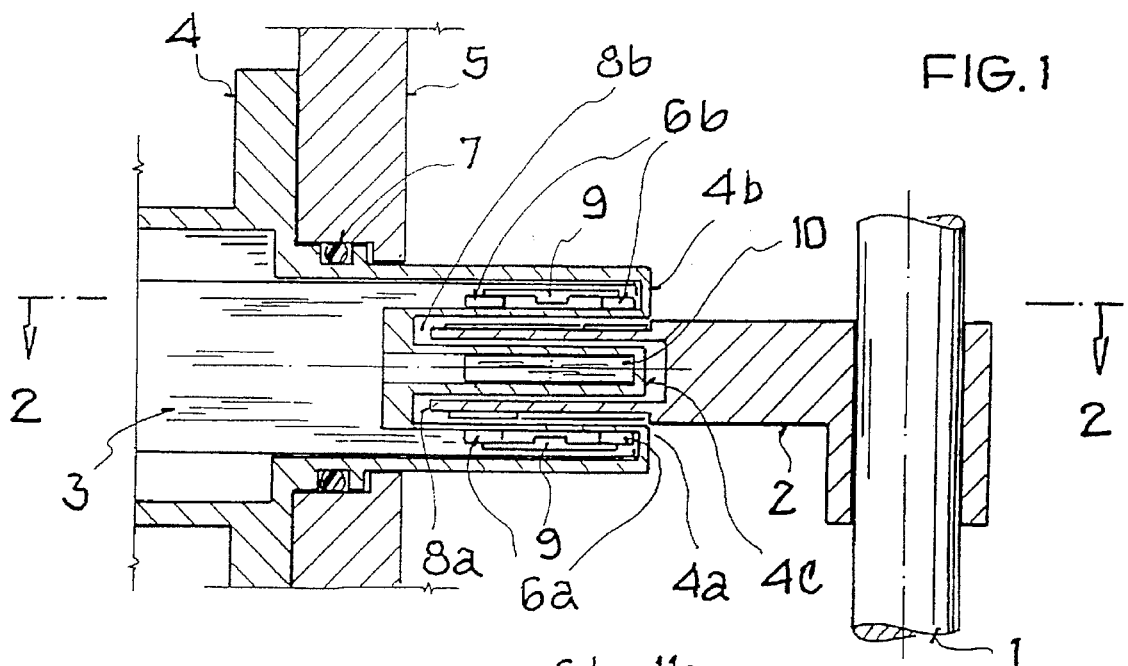
FIG. 1 A cross-sectional view of an embodiment example of the arrangement according to the invention.
Figure 2:
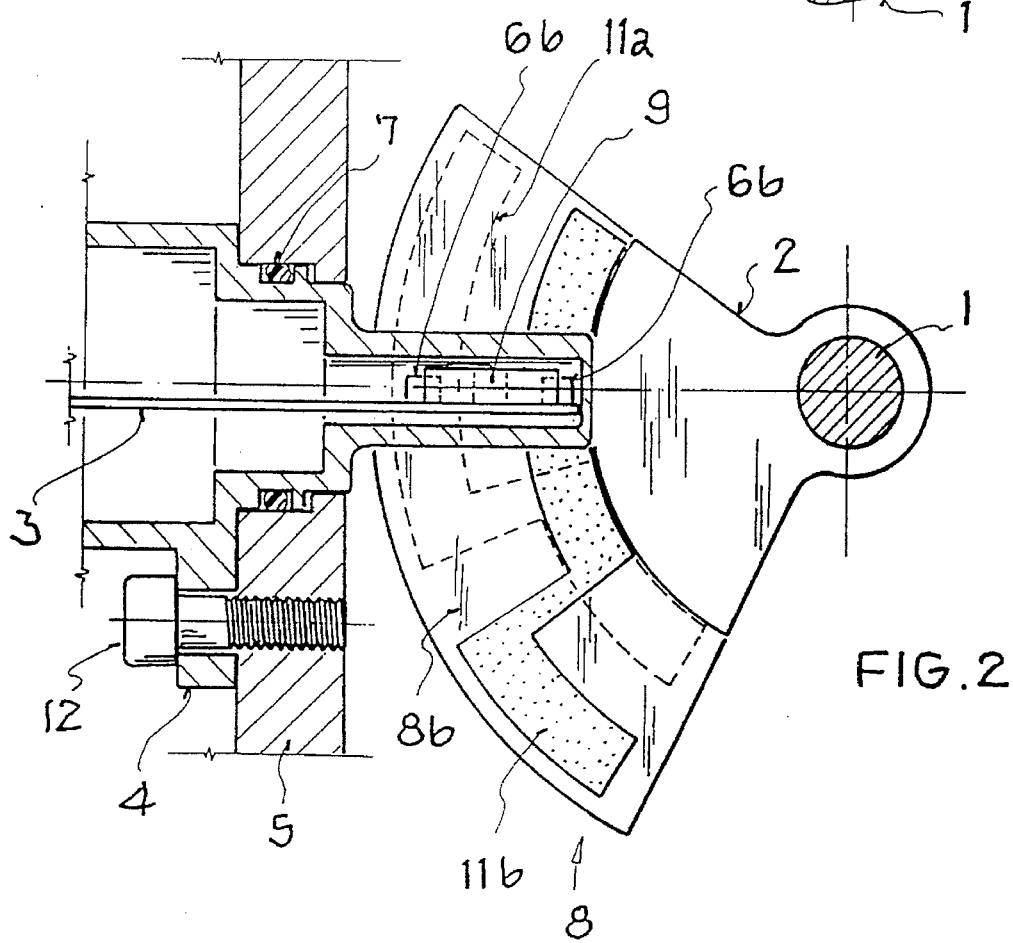
FIG. 2 A longitudinal sectional view of the embodiment example shown in FIG. 1 along the section 2—2.

The embodiment example in accordance with FIGS. 1 and 2 represents a device for detecting the shift status of a motor vehicle change gearbox fitted in a gearbox casing. Part of this gearbox casing wall is designated by the reference number 5 and in the region of a gear shift shaft 1 it has an opening in which a carrier arrangement 4 is fitted. This carrier arrangement 4 is secured to the gearbox casing wall 5 by means of a bolt 12 and sealed against the inside of the gearbox with a seal 7. As can be seen from FIG. 1, this carrier arrangement 4 is E-shaped and has a middle leg 4c and two outer legs 4a and 4b. The middle leg 4c of this carrier arrangement 4 contains a permanent magnet 10 with its pole axis extending along the leg, while the two outer legs 4a and 4b each contain a pair of spaced Hall sensors 6a and 6b. These Hall sensors 6a and 6b are arranged on a printed circuit board 3 which is placed in the carrier arrangement 4 such that each pair of sensors extends along a line parallel to the pole axis of the magnet. Towards the outside, this carrier arrangement 4 is closed by a connector joined to the printed circuit board 3.

The Hall sensors 6a and 6b arranged in the two legs 4a and 4b are placed at the same height as the end faces of the permanent magnet 10 and on the side of the Hall sensors facing away from the magnet there is a screening plate 9 made of ferromagnetic material that is used to amplify the field of the magnetic circuit and to deflect the magnetic flux when screening the Hall sensors by the screening device 8.

The gear shift shaft 1 is rigidly connected to a carrier element 2 that carries the screening device. As shown in FIG. 1, this screening device 8 has a U-shaped cross-section with the two legs 8a and 8b shaped as disks so that they can move between the legs 4a and 4c and between 4b and 4c respectively. Together with the carrier element 2, the two legs 8a and 8b each have the shape of a circular segment with a centre angle of approx. 90°.

In order to influence the magnetic field flowing through the sensors 6a and 6b, screening plates 11a and 11b made of ferromagnetic material are fitted to the disk-shaped legs 8a and 8b of the screening device 8 which in this case is formed of non-magnetic material. When positioned between a sensor and the magnet, these screening plates 11a and 11b magnetically screen the sensor concerned. Furthermore, these screening plates 11a and 11b are shaped and have openings (no ferromagnetic material present) through which the magnetic field passes when this opening is in the appropriate position in front of a sensor. Consequently, there are two states for each sensor, namely the "non-screened" state, where the sensor responds to the magnetic field, and the "screened" state, where the Hall sensor does not respond. In each leg 4a and 4b of the carrier arrangement 4 there are two Hall sensors 6a and 6b, as shown in FIG. 1, so that by coding the screening device 8, that is by appropriately distributing the openings in the screening plates 11a and 11b, up to sixteen shift states of the gearbox can be determined.

The arrangement shown in FIGS. 1 and 2 can be modified in a variety of ways. For instance, it is also possible to make the carrier arrangement 4 U-shaped by omitting one leg so that one leg of the screening device 8 can also be omitted. This arrangement, as well as the arrangement described in FIGS. 1 and 2, can be provided with any desired number of sensors. The number of detectable gear shift states is given by the formula $2^n$, where n is the number of sensors. Thus, with only two sensors, four positions of the gear shaft can be determined, whereas with the known device twice as many would be needed. As the number of gear shaft positions to be detected increases, this proportion becomes even better in favour of the device according to the invention.

Moreover, it is conceivably possible for the screening device 8 to be made of a ferromagnetic material, with the requisite coding on the screening plates 11a and 11b described above being provided by means of openings. This would, however, have the disadvantage that on changing the coding the entire screening device 8 would have to be exchanged. In the embodiment example described above with the screening plates 11a and 11b, it is simply necessary to exchange these screening plates when the coding is altered.

Instead of the Hall sensors used in the embodiment example described above, other magnetically sensitive sensors such as reed switches or magnetoresistive sensors can be used.

What is claimed is:

1. Device for detecting the angle of rotation of a shaft where the position of the shaft is scanned without contacting or touching by means of magnetic-field-sensitive sensors disposed in a support casing and where the magnetic field strength varies at the point where the sensors are located according to the position of the shaft, said device comprising:

a U-shaped carrier arrangement mounted in the support casing and having legs extending adjacent a shaft whose rotation is to be detected;

a permanent magnet mounted on a first leg of said carrier with its pole axis extending along said first leg of said carrier;

a pair of spaced sensors arranged on a second leg of said carrier opposite said first leg and adjacent to the magnet along a line parallel to said pole axis such that the sensors can be permeated by the magnetic field of the magnet;

a field strengthening plate of ferromagnetic material extending between the two sensors and arranged on the side of the sensors facing away from the magnet; and, a screening device connected to the shaft for rotation therewith, said screening device comprising a flat plate mounted on the shaft and extending into the space between the first and second legs of the carrier substantially parallel to the permanent magnet; and means disposed on the plate and arranged in a coded pattern for the respective sensors for influencing the magnetic field flowing through the respective sensors such that the sensors generate a signal that unambiguously identifies the position of the shaft.

2. Device in accordance with claim 1, wherein the flat plates are made of ferromagnetic material and the means for influencing the magnetic field flowing thought he sensors includes at least one opening in each of said plates for each respective associated sensor.

3. Device in accordance with claim 1, wherein Hall sensors, reed switches or magnetoresistive sensors are used as said sensors.

4. Use of the device in accordance with claim 3 for detecting the shift state of a change gear box for a motor vehicle.

5. Use of the device in accordance with claim 3 for detecting the shift state of an automatic change gear box for a motor vehicle.

6. Use of the device in accordance with claim 3 for detecting the position of the camshaft of a motor vehicle internal combustion engine.

7. Use of the device in accordance with claim 3 for detecting the position of a throttle potentiometer in the intake tube of a motor vehicle internal combustion engine.

8. Device in accordance with claim 1, wherein each of the plates is made of non ferromagnetic material and the means for influencing the magnetic field permeating the sensors consist of ferromagnetic material disposed in certain places on each of said plates.

9. Device in accordance with claim 1 wherein the respective sensors of said pair are positioned adjacent the respective pole ends of the permanent magnet.

10. Device in accordance with claim 8 wherein the ferromagnetic material is disposed in circumferentially extending strips adjacent the respective sensors.

11. Device for detecting the angle of rotation of a shaft where the position of the shaft is scanned without contacting or touching by means of magnetic-field-sensitive sensors disposed in a support casing and where the magnetic field strength varies at the point where the sensors are located according to the position of the shaft, said device comprising:

- an E-shaped carrier arrangement mounted in the support casing and having legs extending adjacent a shaft whose rotation is to be detected;
- a permanent magnet mounted on a first leg of said carrier with its pole axis extending along the center leg of said carrier;
- a pair of spaced sensors arranged on each of the outer legs of said carrier adjacent to the magnet along a line parallel to said pole axis such that the sensors can be permeated by the magnetic field of the magnet;
- a respective field strengthening plate of ferromagnetic material extending between the two sensors of a pair and arranged on the side of the sensors facing away from the magnet; and,
- a screening device connected to the shaft for rotation therewith, said screening device comprising a pair of flat plates mounted on the shaft and each extending radially into a respective space between the middle leg of the carrier and a respective outer leg of the carrier so that each plate of the screening device moves in the space between the magnet and the respective pair of sensors; and
- means disposed on each plate and arranged in a coded pattern for the respective sensors for influencing the magnetic field flowing through the respective sensors such that the sensors generate a signal that unambiguously identifies the position of the shaft.

12. Device in accordance with claim 11, wherein Hall sensors, reed switches or magnetoresistive sensors are used as said sensors.

13. Use of the device in accordance with claim 12 for detecting the shift state of a change gear box for a motor vehicle.

14. Use of the device in accordance with claim 12 for detecting the shift state of an automatic change gear box for a motor vehicle.

15. Use of the device in accordance with claim 12 for detecting the position of the camshaft of a motor vehicle internal combustion engine.

16. Use of the device in accordance with claim 12 for detecting the position of a throttle potentiometer in the intake tube of a motor vehicle internal combustion engine.

17. Device in accordance with claim 11, wherein each flat plate is made of ferromagnetic material and the means for influencing the magnetic field flowing thought the sensors includes at least one opening in each said plate for each respective associated sensor.

18. Device in accordance with claim 11, wherein each plate is made of non ferromagnetic material and the means for influencing the magnetic field permeating the sensors consist of ferromagnetic material disposed in certain places on each said plate.

19. Device in accordance with claim 18 wherein the ferromagnetic material is disposed in circumferentially extending strips adjacent the respective sensors.

20. Device in accordance with claim 11 wherein the respective sensors of each pair are positioned adjacent the respective pole ends of the permanent magnet.

* * * * *